United States Patent
Kromer et al.

(10) Patent No.: US 10,663,222 B2
(45) Date of Patent: *May 26, 2020

(54) SYSTEM AND METHOD FOR ENHANCED RECOVERY OF ARGON AND OXYGEN FROM A NITROGEN PRODUCING CRYOGENIC AIR SEPARATION UNIT

(71) Applicants: Brian R. Kromer, Buffalo, NY (US); James R. Handley, East Amherst, NY (US); Neil M. Prosser, Lockport, NY (US)

(72) Inventors: Brian R. Kromer, Buffalo, NY (US); James R. Handley, East Amherst, NY (US); Neil M. Prosser, Lockport, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/962,245

(22) Filed: Apr. 25, 2018

(65) Prior Publication Data
US 2019/0331417 A1 Oct. 31, 2019

(51) Int. Cl.
F25J 3/04 (2006.01)

(52) U.S. Cl.
CPC .......... *F25J 3/04169* (2013.01); *F25J 3/048* (2013.01); *F25J 3/04024* (2013.01); *F25J 3/04187* (2013.01); *F25J 3/04406* (2013.01); *F25J 2210/06* (2013.01); *F25J 2210/40* (2013.01); *F25J 2215/40* (2013.01); *F25J 2215/42* (2013.01); *F25J 2220/40* (2013.01); *F25J 2230/30* (2013.01); *F25J 2230/40* (2013.01); . *F25J 2245/50* (2013.01); *F25J 2270/14* (2013.01)

(58) Field of Classification Search
CPC .. F25J 3/04666; F25J 3/04672; F25J 3/04703; F25J 3/048; F25J 3/04448; F25J 2215/52; F25J 2215/0409; F25J 2210/06; F25J 2230/40; F25J 2245/50; F25J 3/04619; F25J 3/04412
See application file for complete search history.

(56) References Cited

U.S. PATENT DOCUMENTS

| | | |
|---|---|---|
| 4,575,388 A | 3/1986 | Okada |
| 4,822,395 A | 4/1989 | Cheung |

(Continued)

OTHER PUBLICATIONS

Harry Cheung; "Moderate-pressure cryogenic air separation process"; Gas Separation & Purification; Mar. 1991; vol. 5; pp. 25-28.

*Primary Examiner* — Brian M King
(74) *Attorney, Agent, or Firm* — Robert J. Hampsch

(57) ABSTRACT

A moderate pressure air separation unit and air separation cycle is disclosed that provides for up to about 96% recovery of argon, an overall nitrogen recovery of 98 percent or greater and limited gaseous oxygen production. The air separation is configured to produce a first high purity oxygen enriched stream and a second lower purity oxygen enriched stream from the lower pressure column, one of which is used as the refrigerant to condense the argon in the argon condenser, with the resulting vaporized oxygen stream used to regenerate the temperature swing adsorption pre-purifier unit. All or a portion of the first high purity oxygen enriched stream is vaporized in the main heat exchanger to produce the gaseous oxygen products.

3 Claims, 6 Drawing Sheets

(56) References Cited

U.S. PATENT DOCUMENTS

| | | | | |
|---|---|---|---|---|
| 5,069,698 A | * | 12/1991 | Cheung | F25J 3/04412 62/648 |
| 5,255,522 A | * | 10/1993 | Agrawal | F25J 3/04351 62/651 |
| 5,355,681 A | | 10/1994 | Xu | |
| 5,440,884 A | * | 8/1995 | Bonaquist | F25J 3/0409 62/646 |
| 5,802,873 A | * | 9/1998 | Howard | F25J 3/0409 62/646 |
| 5,956,973 A | | 9/1999 | Herron | |
| 6,106,593 A | * | 8/2000 | Golden | B01D 53/0462 95/120 |
| 6,173,586 B1 | * | 1/2001 | Bonaquist | F25J 3/04412 62/643 |
| 2008/0000352 A1 | * | 1/2008 | Howard | B01D 53/047 95/96 |
| 2008/0223077 A1 | * | 9/2008 | Prosser | F25J 3/0409 62/646 |
| 2009/0277220 A1 | * | 11/2009 | Howard | F25J 3/0409 62/643 |
| 2010/0037656 A1 | | 2/2010 | Prosser | |
| 2012/0036892 A1 | | 2/2012 | Prosser | |
| 2014/0245782 A1 | * | 9/2014 | Howard | B01D 53/04 62/640 |
| 2016/0025408 A1 | | 1/2016 | Xu | |
| 2017/0030638 A1 | | 2/2017 | Prosser et al. | |
| 2017/0030640 A1 | | 2/2017 | Du et al. | |
| 2018/0073804 A1 | * | 3/2018 | Allam | F25J 3/0409 |

* cited by examiner

SYSTEM AND METHOD FOR ENHANCED RECOVERY OF ARGON AND OXYGEN FROM A NITROGEN PRODUCING CRYOGENIC AIR SEPARATION UNIT

TECHNICAL FIELD

The present invention relates to the enhanced recovery of argon and oxygen from a nitrogen producing cryogenic air separation unit, and more particularly, to a moderate pressure air separation unit and process for the enhanced recovery of argon and that provides for limited production of moderate pressure oxygen.

BACKGROUND

Air separation plants targeted for production of nitrogen that operate at moderate pressures (i.e. pressures that are higher than conventional air separation unit pressures) have existed for some time. In conventional air separation units, if nitrogen at moderate pressure is desired, the lower pressure column could be operated at a pressure above that of conventional air separation units. However, such operation would typically result in a significant decrease in argon recovery as much of the argon would be lost in the oxygen rich or nitrogen rich streams rather than being passed to the argon column.

To increase the argon recovery in such moderate pressure, nitrogen producing air separation units, a modified air separation cycle was developed in the late 1980s and early 1990s. See, for example, the technical publication Cheung, *Moderate Pressure Cryogenic Air Separation Process, Gas Separation & Purification*, Vol 5, March 1991 and U.S. Pat. No. 4,822,395 (Cheung). In these prior art documents, a nitrogen and argon producing air separation plant with somewhat high argon recovery is disclosed. The modified air separation cycle involves operating the higher pressure column at a nominal pressure of preferably between about 80 to 150 psia, while the lower pressure column preferably operates at a nominal pressure of about 20 to 45 psia, and the argon column would also preferably operate at a nominal pressure of about 20 to 45 psia. Recovery of high purity nitrogen (i.e. >99.98% purity) at moderate pressure of about 20 to 45 psia is roughly 94%. High argon recovery at 97.3% purity and pressures of between about 20 to 45 psia is generally above 90% but is capped at about 93%.

In the above described prior art moderate pressure air separation cycles, high purity liquid oxygen from the sump of the lower pressure column is used as the refrigerant in the argon condenser rather than kettle liquid. However, when using the high purity liquid oxygen from the sump of the lower pressure column, the argon column needs to operate at higher pressures than conventional argon columns in order to achieve the required temperature difference in the argon condenser. The increase in pressure of the argon column requires the lower pressure column and higher pressure column to also operate at pressures higher than conventional air separation units.

The use of high purity liquid oxygen in the argon condenser also means that the large kettle vapor stream that normally feeds the lower pressure column is avoided, which yields a marked improvement in recovery. As a result, high recoveries of nitrogen, argon, and oxygen are possible with this moderate pressure air separation cycle, even though the elevated pressures would otherwise penalize recovery compared to conventional air separation cycles. The moderate pressure operation of the air separation unit is generally beneficial for nitrogen production, as it means the nitrogen compression is less power intensive and the nitrogen compressor will tend to be less expensive than nitrogen compressors of conventional systems.

Even though the air separation unit in the Cheung publication and U.S. Pat. No. 4,822,395 provides a high purity oxygen vapor exiting the argon condenser, this oxygen stream is not used as oxygen product because the stream exits the process at too low pressure (e.g. 18 psia) and would often require an oxygen compressor to deliver oxygen product to a customer at sufficient pressure. In some regions, use of oxygen compressors are generally unacceptable due to safety and cost considerations. When used, oxygen compressors are very expensive and usually require more complex engineered safety systems, both of which adversely impacts the capital cost and operating costs of the air separation unit.

What is needed is an improved moderate pressure air separation unit and moderate pressure air separation cycle that further improves argon recovery and provides for limited oxygen recovery without the need for oxygen compressors.

SUMMARY OF THE INVENTION

The present invention may be characterized as an air separation unit configured to produce one or more high purity nitrogen products and has a nitrogen recovery of 98 percent or greater. The present air separation unit comprises (i) a main air compression system configured for receiving a stream of incoming feed air and producing a compressed air stream; (ii) an adsorption based pre-purifier unit configured for removing water vapor, carbon dioxide, nitrous oxide, and hydrocarbons from the compressed air stream and producing a compressed and purified air stream, wherein the compressed and purified air stream is split into at least a first part of the compressed and purified air stream and a second part of the compressed and purified air stream; (iii) a main heat exchange system configured to cool the first part of the compressed and purified air stream to produce a vapor air stream and to partially cool the second part of the compressed and purified air stream; (iv) a turboexpander arrangement configured to expand the partially cooled second part of the compressed and purified air stream to form an exhaust stream that imparts refrigeration to the air separation unit; (v) a distillation column system having a higher pressure column having an operating pressure between 6.0 bar(a) and 10.0 bar(a) and a lower pressure column having an operating pressure between 1.5 bar(a) and 2.8 bar(a) linked in a heat transfer relationship via a condenser reboiler, wherein the distillation column system further includes an argon column arrangement operatively coupled with the lower pressure column, the argon column arrangement having at least one argon column and an argon condenser. The distillation column system is configured to receive all or a portion of the vapor air stream in the higher pressure column and to receive the exhaust stream in the lower pressure column or higher pressure column and to produce a first oxygen enriched stream from the lower pressure column having a first oxygen concentration greater than or equal to 99.5 percent oxygen, a second oxygen enriched stream from the lower pressure column having a second oxygen concentration greater than 93.0 percent and lower than the first oxygen concentration and a nitrogen overhead stream from the lower pressure column.

The argon column is configured to receive an argon-oxygen enriched stream from the lower pressure column and to produce a third oxygen enriched bottoms stream that is returned to or released into the lower pressure column and an argon-enriched overhead that is directed to the argon condenser, which is configured to condense the argon-enriched overhead against the first oxygen enriched stream or the second oxygen enriched stream to produce a crude argon stream or a product argon stream, an argon reflux stream and an oxygen enriched waste stream; and a liquid oxygen-rich stream.

The air separation unit further includes a subcooler arrangement operatively coupled with the distillation column system and configured to subcool a kettle oxygen stream from the higher pressure column and a nitrogen stream from the condenser-reboiler via indirect heat exchange with the nitrogen overhead stream from the lower pressure column. The subcooler arrangement is further configured to optionally subcool at least one of the oxygen enriched streams from the lower pressure column via indirect heat exchange with the oxygen enriched waste stream. The air separation unit is configured to recover greater than 75 percent argon if the argon is condensed against the first oxygen enriched stream or recover greater than 30 percent argon if the argon is condensed against the second oxygen enriched stream while also producing one or more high purity nitrogen products at a total nitrogen recovery of greater than about 98% and a high purity pumped oxygen stream from the lower pressure column at a pressure greater than or equal to about 3.4 bar(a).

Alternatively, the present invention may be characterized as a method of separating air to produce one or more high purity nitrogen products in a cryogenic air separation unit with a nitrogen recovery of 98 percent or greater. The present method comprises the steps of: (a) compressing a stream of incoming feed air to produce a compressed air stream; (b) purifying the compressed air stream in an adsorption based prepurification unit configured to removing water vapor, carbon dioxide, nitrous oxide, and hydrocarbons from the compressed air stream to producing a compressed and purified air stream; (c) splitting the compressed and purified air stream into at least a first part of the compressed and purified air stream and a second part of the compressed and purified air stream; (d) cooling the first part of the compressed and purified air stream to a vapor air stream at a temperature suitable for rectification in a cryogenic distillation system and partially cooling the second part of the compressed and purified air stream; (e) expanding the partially cooled second part of the compressed and purified air stream in a turbine to form an exhaust stream; (f) rectifying the liquid air stream and exhaust stream in a cryogenic distillation column system having a higher pressure column having an operating pressure between 6.0 bar(a) and 10.0 bar(a) and a lower pressure column having an operating pressure between 1.5 bar(a) and 2.8 bar(a), the higher pressure column and the lower pressure column being linked in a heat transfer relationship via a condenser reboiler, wherein the rectifying step produces a first oxygen enriched stream from the lower pressure column having a first oxygen concentration greater than or equal to 99.5 percent oxygen, a second oxygen enriched stream from the lower pressure column having a second oxygen concentration greater than 93.0 percent and preferably lower than the first oxygen concentration, a nitrogen overhead stream from the lower pressure column; and a condensed nitrogen stream from the condenser-reboiler; (g) rectifying an oxygen-argon stream extracted from the lower pressure column in an argon column arrangement configured to produce a third oxygen enriched stream as a bottoms stream and an argon-enriched overhead; (h) subcooling a fourth oxygen enriched stream (i.e. kettle stream) from the higher pressure column and the condensed nitrogen stream from the condenser-reboiler via indirect heat exchange with the nitrogen overhead stream from the lower pressure column and optionally subcooling one or more oxygen enriched streams from the lower pressure column in a subcooler unit via indirect heat exchange with an oxygen enriched waste stream; (i) returning the third oxygen enriched stream from the argon column to the lower pressure column; (j) directing the argon-enriched overhead from the argon column to an argon condenser; and (k) condensing the argon-enriched overhead in the argon condenser against the second oxygen enriched stream from the lower pressure column to produce a crude argon stream or a product argon stream, an argon reflux stream and an oxygen enriched waste stream.

As with the air separation system, the present method of air separation provides an argon recovery greater than 75 percent argon if the argon is condensed against the first oxygen enriched stream and an argon recovery greater than 30 percent argon if the argon is condensed against the second oxygen enriched stream while also producing one or more high purity nitrogen products at a total nitrogen recovery of greater than about 98% and a high purity pumped oxygen stream from the lower pressure column at a pressure greater than or equal to about 3.4 bar(a).

In the present system and method, the adsorption based pre-purifier unit is preferably a multi-bed temperature swing adsorption unit configured to purifying the compressed air stream, the multi-bed temperature swing adsorption unit is configured such that each bed alternates between an on-line operating phase adsorbing the water vapor, carbon dioxide, and hydrocarbons from the compressed air stream and an off-line operating phase where the bed is regenerated or purged with the oxygen enriched waste stream, preferably having greater than 90 percent oxygen content and up to about 99.5 percent oxygen. The adsorption based pre-purifier unit preferably further includes a steam heater, electric heater, or other non-fired heater configured to heat the oxygen enriched waste stream to a temperature less than or equal to about 450° F., preferably less than about 400° F. for use in regenerating the adsorbent beds in the temperature swing adsorption unit.

The preferred argon column arrangement is configured to operate at a pressure of between about 1.3 bar(a) and 2.8 bar(a) and may be configured as is a superstaged column having between 180 and 260 stages of separation and a high ratio column. Alternatively, the argon column arrangement may be configured as an ultra-superstaged column having between 185 and 270 stages of separation. Optionally, an argon refining system configured to refine the crude argon stream to produce a high purity argon product stream may be disposed downstream of the argon condenser, the argon refining system. In such embodiments, the argon refining system may be an argon liquid adsorption based system, an argon gaseous phase adsorption based system, or a catalytic deoxo based system.

BRIEF DESCRIPTION OF THE DRAWINGS

While the present invention concludes with claims distinctly pointing out the subject matter that Applicants regard as their invention, it is believed that the invention will be better understood when taken in connection with the accompanying drawings in which:

DETAILED DESCRIPTION

The presently disclosed system and method provides for cryogenic separation of air in a moderate pressure air separation unit characterized by a very high recovery of nitrogen, a high recovery of argon, and limited production of high purity oxygen. As discussed in more detail below, either a portion of high purity oxygen enriched stream taken from the lower pressure column or a lower purity oxygen enriched stream taken from the lower pressure column is used as the condensing medium in the argon condenser to condense the argon-rich stream and the oxygen rich boil-off from the argon condenser is then used as a purge gas to regenerate the adsorbent beds in the adsorption based pre-purifier unit. Details of the present system and method are provided in the paragraphs that follow.

Recovery of Nitrogen, Argon and Oxygen in Moderate Pressure Air Separation Unit

Figure 1:
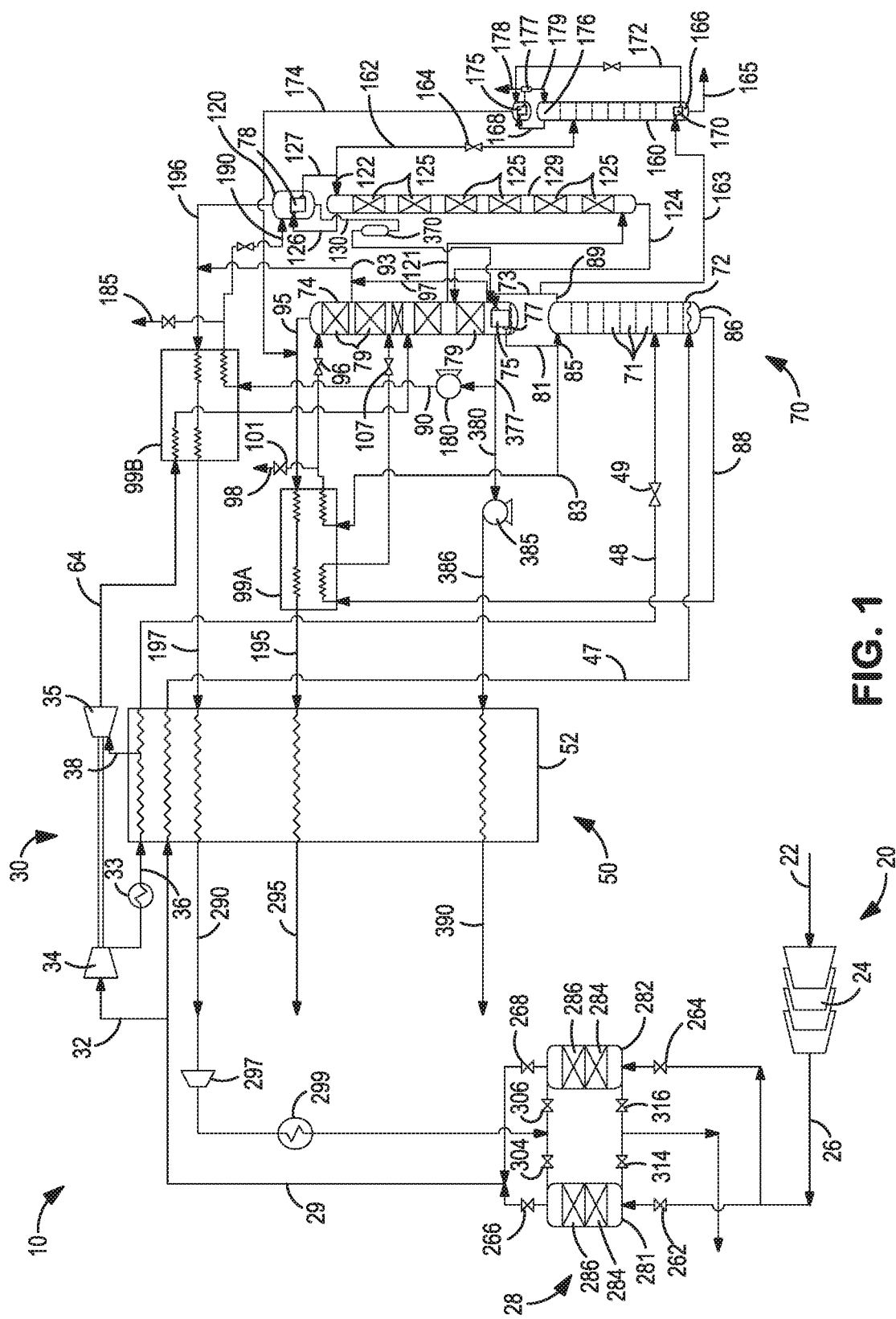
FIG. 1 is a schematic process flow diagram of an air separation unit in accordance with an embodiment of the present invention.

Turning to the Figs., and in particular FIG. 1, there is shown simplified schematic illustrations of an air separation unit 10. In a broad sense, the depicted air separation units include a main feed air compression train or system 20, a turbine air circuit 30, an optional booster air circuit 40, a primary heat exchanger system 50, and a distillation column system 70. As used herein, the main feed air compression train, the turbine air circuit, and the booster air circuit, collectively comprise the 'warm-end' air compression circuit. Similarly, the main or primary heat exchanger, portions of the turbine based refrigeration circuit and portions of the distillation column system are referred to as 'cold-end' systems/equipment that are typically housed in insulated cold boxes.

In the main feed compression train shown in the Figs., the incoming feed air 22 is typically drawn through an air suction filter house (ASFH) and is compressed in a multi-stage, intercooled main air compressor arrangement 24 to a pressure that can be between about 6.5 bar(a) and about 11 bar(a). This main air compressor arrangement 24 may include integrally geared compressor stages or a direct drive compressor stages, arranged in series or in parallel. The compressed air stream 26 exiting the main air compressor arrangement 24 is fed to an aftercooler (not shown) with integral demister to remove the free moisture in the incoming feed air stream. The heat of compression from the final stages of compression for the main air compressor arrangement 24 is removed in aftercoolers by cooling the compressed feed air with cooling tower water. The condensate from this aftercooler as well as some of the intercoolers in the main air compression arrangement 24 is preferably piped to a condensate tank and used to supply water to other portions of the air separation plant.

The cool, dry compressed air stream 26 is then purified in a pre-purification unit 28 to remove high boiling contaminants from the cool, dry compressed air feed. A pre-purification unit 28, as is well known in the art, typically contains two beds of alumina and/or molecular sieve operating in accordance with a temperature swing adsorption cycle in which moisture and other impurities, such as carbon dioxide, water vapor and hydrocarbons, are adsorbed. While one of the beds is used for pre-purification of the cool, dry compressed air feed while the other bed is regenerated, preferably with a portion of the waste nitrogen from the air separation unit. The two beds switch service periodically. Particulates are removed from the compressed, pre-purified feed air in a dust filter disposed downstream of the pre-purification unit 28 to produce the compressed, purified air stream 29.

The compressed and purified air stream 29 is separated into oxygen-rich, nitrogen-rich, and argon-rich fractions in a plurality of distillation columns including a higher pressure column 72, a lower pressure column 74, and an argon column 129. Prior to such distillation however, the compressed and pre-purified air stream 29 is typically split into a plurality of feed air streams, which may include a boiler air stream (See 320 in FIGS. 3 and 4) and a turbine air stream 32. The boiler air stream may be further compressed in a booster compressor arrangement (See 340 in FIGS. 3 and 4) and subsequently cooled in aftercooler (See 340 in FIGS. 3 and 4) to form a boosted pressure air stream 360 which is then further cooled to temperatures required for rectification in the main heat exchanger 52. Cooling or partially cooling of the air streams in the main heat exchanger 52 is preferably accomplished by way of indirect heat exchange with the warming streams which include the oxygen streams 197, 386 as well as nitrogen streams 195 from the distillation column system 70 to produce cooled feed air streams.

The partially cooled feed air stream 38 is expanded in the turbine 35 to produce exhaust stream 64 that is directed to the lower pressure column 74. Refrigeration for the air separation unit 10 is also typically generated by the turbine 35 and other associated cold and/or warm turbine arrangements, such as closed loop warm refrigeration circuits that are generally known in the art. The fully cooled air stream 47 as well as the elevated pressure air stream (See stream 364 in FIGS. 3 and 4) are introduced into higher pressure column 72. Optionally, a minor portion of the air flowing in turbine air circuit 30 is not withdrawn in turbine feed stream 38. Optional boosted pressure stream 48 is withdrawn at the cold end of heat exchanger 52, fully or partially condensed, let down in pressure in valve 49 and fed to higher pressure column 72, several stages from the bottom. Stream 48 is utilized only when the magnitude of pumped oxygen stream 386 is sufficiently high.

The main heat exchanger 52 is preferably a brazed aluminum plate-fin type heat exchanger. Such heat exchangers are advantageous due to their compact design, high heat transfer rates and their ability to process multiple streams. They are manufactured as fully brazed and welded pressure vessels. For small air separation unit units, a heat exchanger comprising a single core may be sufficient. For larger air separation unit units handling higher flows, the heat exchanger may be constructed from several cores which must be connected in parallel or series.

The turbine based refrigeration circuits are often referred to as either a lower column turbine (LCT) arrangement or an upper column turbine (UCT) arrangement which are used to provide refrigeration to a two-column or three column cryogenic air distillation column systems. In the UCT arrangement shown in the Figs., the compressed, cooled turbine air stream 32 is preferably at a pressure in the range from between about 6 bar(a) to about 10.7 bar(a). The compressed, cooled turbine air stream 32 is directed or introduced into main or primary heat exchanger 52 in which it is partially cooled to a temperature in a range of between about 140 and about 220 Kelvin to form a partially cooled, compressed turbine air stream 38 that is introduced into a turbine 35 to produce a cold exhaust stream 64 that is then introduced into the lower pressure column 74 of the distillation column system 70. The supplemental refrigeration created by the expansion of the stream 38 is thus imparted directly to the lower pressure column 72 thereby alleviating some of the cooling duty of the main heat exchanger 52. In some embodiments, the turbine 35 may be coupled with booster compressor 34 that is used to further compress the turbine air stream 32, either directly or by appropriate gearing.

While the turbine based refrigeration circuit illustrated in the Figs. is shown as an upper column turbine (UCT) circuit where the turbine exhaust stream is directed to the lower pressure column, it is contemplated that the turbine based refrigeration circuit alternatively may be a lower column turbine (LCT) circuit or a partial lower column (PLCT) where the expanded exhaust stream is fed to the higher pressure column 72 of the distillation column system 70. Still further, turbine based refrigeration circuits may be some variant or combination of LCT arrangement, UCT arrangement and/or a warm recycle turbine (WRT) arrangement, generally known to those persons skilled in the art.

The aforementioned components of the incoming feed air stream, namely oxygen, nitrogen, and argon are separated within the distillation column system 70 that includes a higher pressure column 72, a lower pressure column 74, a super-staged argon column 129, a condenser-reboiler 75 and an argon condenser 78. The higher pressure column 72 typically operates in the range from between about 6 bar(a) to about 10 bar(a) whereas lower pressure column 74 operates at pressures between about 1.5 bar(a) to about 2.8 bar(a). The higher pressure column 72 and the lower pressure column 74 are preferably linked in a heat transfer relationship such that all or a portion of the nitrogen-rich vapor column overhead, extracted from proximate the top of higher pressure column 72 as stream 73, is condensed within a condenser-reboiler 75 located in the base of lower pressure column 74 against the oxygen-rich liquid column bottoms 77 residing in the bottom of the lower pressure column 74. The boiling of oxygen-rich liquid column bottoms 77 initiates the formation of an ascending vapor phase within lower pressure column 74. The condensation produces a liquid nitrogen containing stream 81 that is divided into a clean shelf reflux stream 83 that may be used to reflux the lower pressure column 74 to initiate the formation of descending liquid phase in such lower pressure column 74 and a nitrogen-rich stream 85 that refluxes the higher pressure column 72.

Cooled feed air stream 47 is preferably a vapor air stream slightly above its dew point, although it may be at or slightly below its dew point, that is fed into the higher pressure column for rectification resulting from mass transfer between an ascending vapor phase and a descending liquid phase that is initiated by reflux stream 85 occurring within a plurality of mass transfer contacting elements, illustrated as trays 71. This produces crude liquid oxygen column bottoms 86, also known as kettle liquid which is taken as stream 88, and the nitrogen-rich column overhead 89, taken as clean shelf liquid stream 83.

In the lower pressure column, the ascending vapor phase includes the boil-off from the condenser-reboiler as well as the exhaust stream 64 from the turbine 35 which is subcooled in subcooling unit 99B and introduced as a vapor stream at an intermediate location of the lower pressure column 72. The descending liquid is initiated by nitrogen reflux stream 83, which is sent to subcooling unit 99A, where it is subcooled and subsequently expanded in valve 96 prior to introduction to the lower pressure column 74 at a location proximate the top of the lower pressure column. If needed, a small portion of the subcooled nitrogen reflux stream 83 may be taken via valve 101 as liquid nitrogen product 98.

Lower pressure column 74 is also provided with a plurality of mass transfer contacting elements, that can be trays or structured packing or random packing or other known elements in the art of cryogenic air separation. The contacting elements in the lower pressure column 74 are illustrated as structured packing 79. The separation occurring within lower pressure column 74 produces an oxygen-rich liquid column bottoms 77 extracted as an oxygen enriched liquid stream 377 having an oxygen concentration of greater than 99.5%. The lower pressure column further produces a nitrogen-rich vapor column overhead that is extracted as a gaseous nitrogen product stream 95.

Oxygen enriched liquid stream 377 can be separated into a first oxygen enriched liquid stream 380 that is pumped in pump 385 and the resulting pumped oxygen stream 386 is directed to the main heat exchanger 52 where it is warmed to produce a high purity gaseous oxygen product stream 390. A second portion of the oxygen enriched liquid stream 377 is diverted as second oxygen enriched liquid stream 90. The second oxygen enriched liquid stream 90 is preferably pumped via pump 180 then subcooled in subcooling unit 99B via indirect heat exchange with the oxygen enriched waste stream 196 and then passed to argon condenser 78 where it is used to condense the argon-rich stream 126 taken from the overhead 123 of the argon column 129. As an alternative, second oxygen enriched liquid stream 90 may be diverted after pump 385. This will avoid the need for pump 180. As shown in FIG. 1, a portion of the subcooled second oxygen enriched liquid stream 90 may be taken as liquid oxygen product 185. Alternatively, a portion of the first liquid oxygen stream may be taken as liquid oxygen product.

The vaporized oxygen stream that is boiled off from the argon condenser 78 is an oxygen enriched waste stream 196 that is warmed within subcooler 99B. The warmed oxygen enriched waste stream 197 is directed to the main or primary heat exchanger and then used as a purge gas to regenerate the adsorption based prepurifier unit 28. Additionally, a waste nitrogen stream 93 may be extracted from the lower pressure column to control the purity of the gaseous nitrogen product stream 95. The waste nitrogen stream 93 is preferably combined with the oxygen enriched waste stream 196 upstream of subcooler 99B. Also, vapor waste oxygen stream 97 may be needed in some cases when more oxygen is available than is needed to operate argon condenser 78. This is most likely when argon production is reduced.

Liquid stream 130 is withdrawn from argon condenser vessel 120, passed through gel trap 370 and returned to the base or near the base of lower pressure column 74. Gel trap 370 serves to remove carbon dioxide, nitrous oxide, and certain heavy hydrocarbons that might otherwise accumulate in the system. Alternatively, a small flow can be withdrawn via stream 130 as a drain from the system such that gel trap 140 is eliminated (not shown).

Preferably, the argon condenser shown in the Figs. is a downflow argon condenser. The downflow configuration makes the effective delta temperature ($\Delta T$) between the condensing stream and the boiling stream smaller. As indicated above, the smaller $\Delta T$ may result in reduced operating pressures within the argon column, lower pressure column, and higher pressure column, which translates to a reduction in power required to produce the various product streams as well as improved argon recovery. The use of the downflow argon condenser also enables a potential reduction in the number of column stages, particularly for the argon column. Use of an argon downflow condenser is also advantageous from a capital standpoint, in part, because pump 180 is already required in the presently disclosed air separation cycles. Also, since liquid stream 130 already provides a continuous liquid stream exiting the argon condenser shell which also provides the necessary wetting of the reboiling surfaces to prevent the argon condenser from 'boiling to dryness'.

Nitrogen product stream 95 is passed through subcooling unit 99A to subcool the nitrogen reflux stream 83 and kettle liquid stream 88 via indirect heat exchange. As indicated above, the subcooled nitrogen reflux stream 83 is expanded in valve 96 and introduced into an uppermost location of the lower pressure column 74 while the subcooled the kettle liquid stream 88 is expanded in valve 107 and introduced to an intermediate location of the lower pressure column 74. After passage through subcooling units 99A, the warmed nitrogen stream 195 is further warmed within main or primary heat exchanger 52 to produce a warmed gaseous nitrogen product stream 295.

The flow of the first oxygen enriched liquid stream 380 may be up to about 20% of the total oxygen enriched streams exiting the system. The argon recovery of this arrangement is between about 75% and 96% which is greater than the prior art moderate pressure air separation systems. Although not shown, a stream of liquid nitrogen taken from an external source (not shown) may be combined with the second oxygen enriched liquid stream 90 and the combined stream used to condense the argon-rich stream 126 in the argon condenser 78, to enhance the argon recovery.

Figure 2:
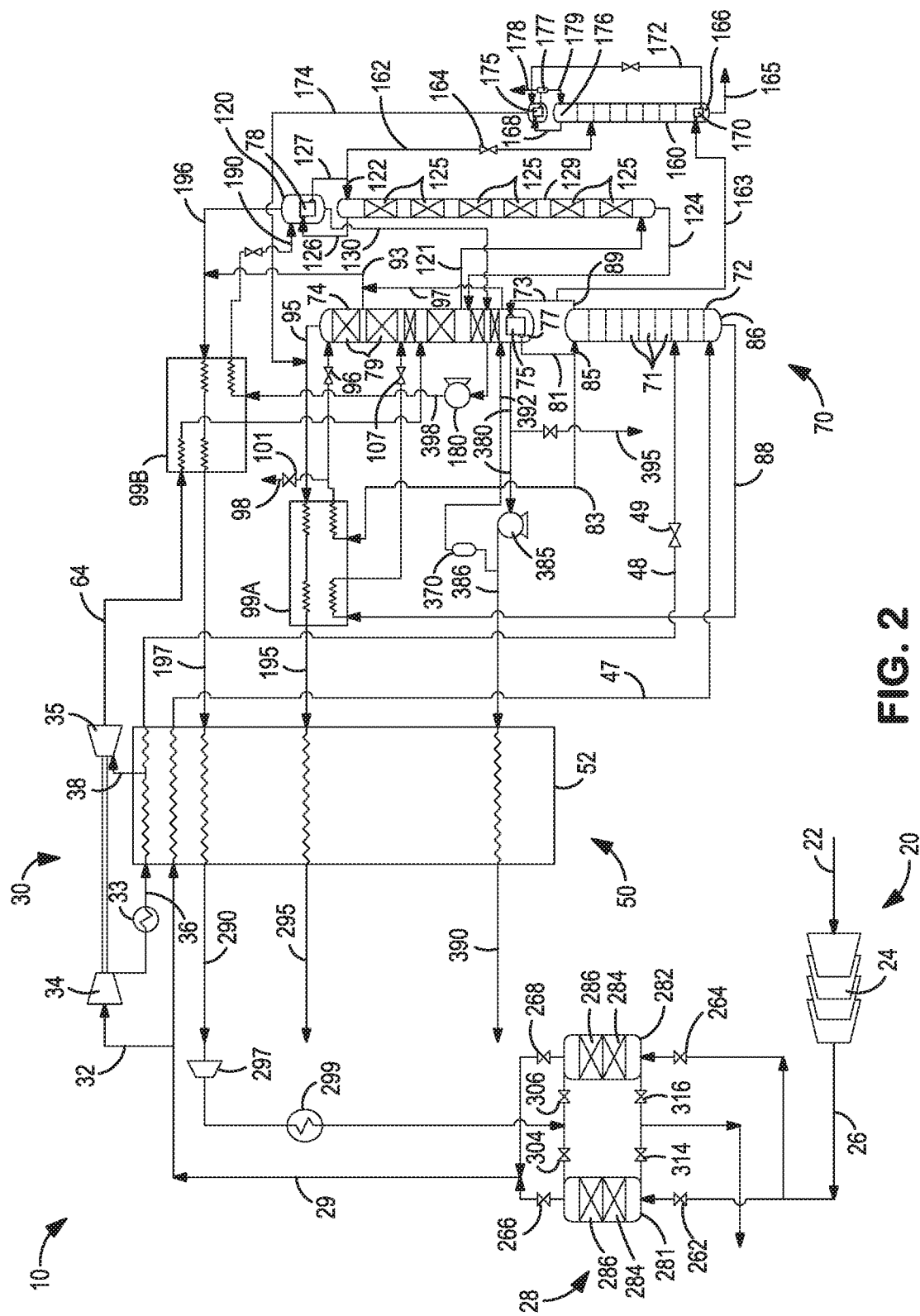
FIG. 2 is a schematic process flow diagram of an air separation unit in accordance with another embodiment of the present invention.

An alternative embodiment of the present air separation unit and associated air separation cycle is shown in FIG. 2. Many of the components in the air separation plant shown in FIG. 2 are similar to those described above with reference to FIG. 1 and for sake of brevity will not be repeated. The differences between the embodiment of FIG. 2 compared to the embodiment shown in FIG. 1 is that two separate oxygen enriched liquid streams are taken from the lower pressure column. The first oxygen enriched liquid stream 380 is taken directly from the sump where the oxygen-rich liquid column bottoms 77 are located and has oxygen concentration of greater than 99.5%. The first oxygen enriched liquid stream 380 is pumped in pump 385 and directed to the main heat exchanger 52 where it is warmed to produce a high purity gaseous oxygen product stream 390. A portion of the first liquid oxygen stream 380 may preferably be taken as liquid oxygen product 395.

The second oxygen enriched liquid stream 398 is preferably taken from the lower pressure column 74 at a location a few stages above the point where the first oxygen enriched liquid stream 380 is extracted and will have an oxygen concentration between about 93.0% and 99.7%. The second oxygen enriched liquid stream 398 is pumped via pump 180 then subcooled in subcooling unit 99B via indirect heat exchange with the oxygen enriched waste stream 196 and then passed to argon condenser 78 where it is used to condense the argon-rich stream 126 taken from the overhead 123 of the argon column 129. As with the embodiment of FIG. 1, a stream of liquid nitrogen taken from an external source (not shown) may be combined with the second oxygen enriched liquid stream 398 in an effort to enhance the argon recovery. The combined stream is used to condense the argon-rich stream 126 in the argon condenser 78.

In FIG. 2, stream 392, after pump 385 is preferably passed through gel trap 370. It is then returned to the base or near the base of lower pressure column 74. Liquid stream 130 is withdrawn from argon condenser vessel 120 and returned to the low pressure column immediately below the draw location of stream 398. Alternatively, a small flow can be withdrawn via stream 392 as a drain from the system such that gel trap 140 is eliminated (not shown). In the case that stream 392 is drained from the system, it can alternatively be diverted from high purity oxygen enriched liquid stream 380, before pump 385. In this case, stream 395 can represent a drain stream or a liquid oxygen product stream in addition to a drain stream The arrangement shown in FIG. 2 provides four potential advantages compared to the arrangements of FIG. 1 as well as compared to the prior art systems, particularly for situations where maximum argon recovery is not needed. The use of the second oxygen enriched liquid stream 398 (i.e. lower purity liquid oxygen) instead of the first oxygen enriched liquid stream 380 does necessarily penalize argon recovery from the air separation plant since argon is the primary impurity in second oxygen enriched liquid stream 398. A primary benefit of this configuration is that it enables first oxygen enriched stream 380 to be withdrawn at a higher oxygen purity.

An additional benefit of the arrangement of FIG. 2 is the capability of reduced power consumption. Since the lower purity liquid oxygen sent to the argon condenser boils at a lower temperature, the condensing argon in the argon condenser can be at a lower pressure to achieve the required delta temperature ($\Delta T$). Lower pressure argon means that the argon column, lower pressure column and higher pressure column can operate at lower pressures, although the lower pressure column and argon column will still operate at moderate pressures. Because of the lower pressures in the distillation column system, the power consumption for the main air compressor system can be reduced.

Another potential benefit of the arrangement shown in FIG. 2 is a reduction in the number of separation stages necessary in the argon column due to its lower pressure of operation. A fourth benefit of the arrangement shown in FIG. 2 is that it enables a larger elevated pressure or pumped oxygen product draw. The reduced argon recovery translates to a reduced argon condenser duty, and hence the flow of lower purity oxygen liquid needed for the argon condenser decreases. This, in turn enables a larger pumped oxygen product draw. The pumped oxygen product may now be as high as 50% of the total oxygen enriched streams exiting the system. In this extreme argon recovery may be as low as 30%.

Figure 3:
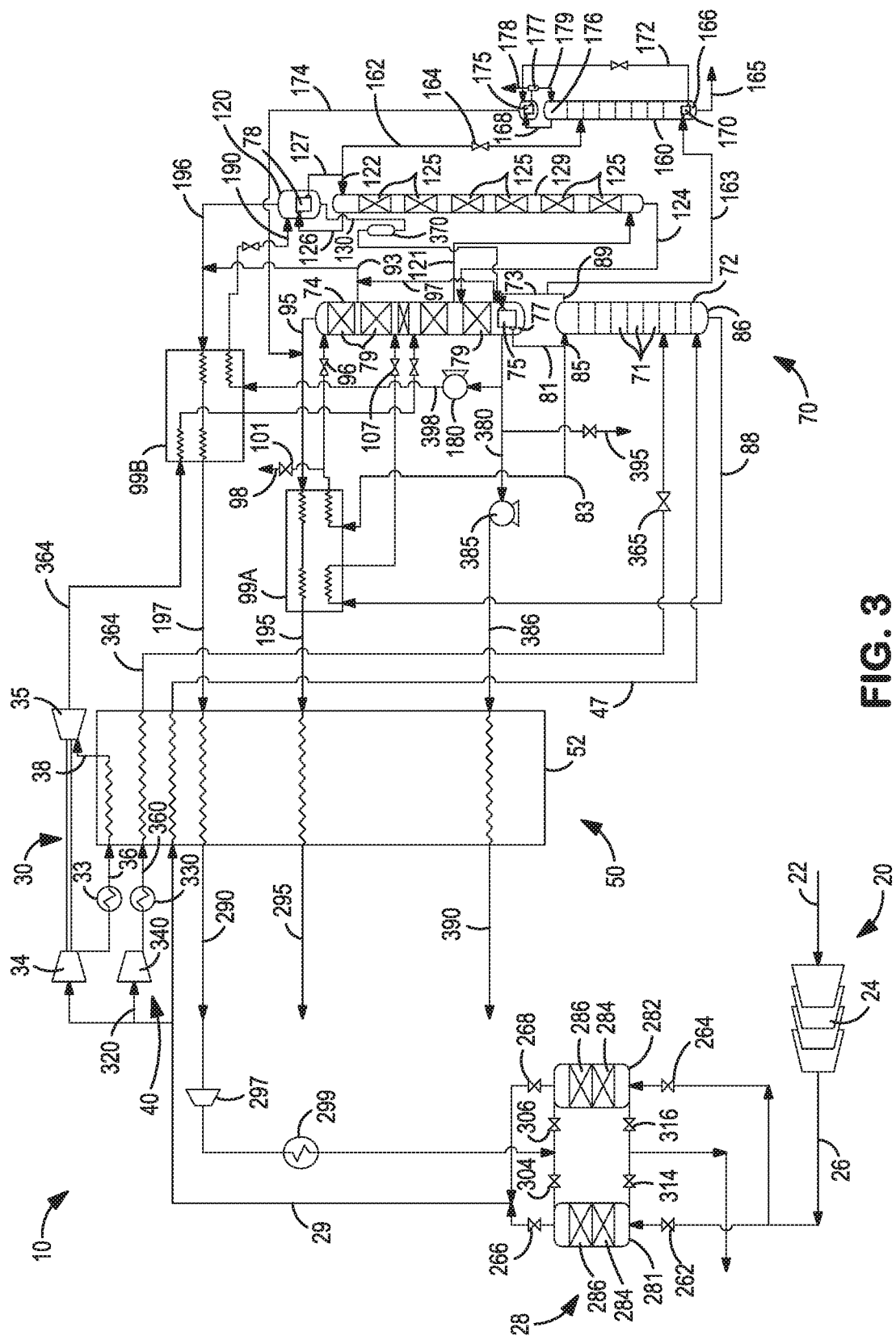
FIG. 3 is a schematic process flow diagram of an air separation unit in accordance with yet another embodiment of the present invention.

Yet another alternative embodiment is shown in FIG. 3. Again, since many of the components in the air separation plant shown in FIG. 3 are similar to those described above with reference to FIGS. 1 and 2, the descriptions of such common components will not be repeated. The difference between the embodiment shown in FIG. 3 and the embodiment of FIG. 1 is the booster air compressor (BAC) circuit.

The BAC circuit shown in FIG. 3 (and FIG. 4) is used to generate an elevated pressure air stream 364 that is higher in pressure than the pumped oxygen stream 386 in the main heat exchanger 52. The BAC circuit preferably takes a diverted portion of the compressed and purified feed air 29. This diverted BAC stream 320 is then further compressed in booster air compressor 340 and then cooled in aftercooler 330. The resulting higher pressure boosted air stream 360 is further cooled in the main heat exchanger 52 to temperatures suitable for rectification in the distillation column system 70 while boiling the adjacent pumped oxygen stream 386 in the main heat exchanger 52. As shown in FIG. 3, the liquefied boosted air stream 364 exiting the cold end of the main heat exchanger 52 is preferably expanded in valve 365 and then supplied to the higher pressure column 72. The embodiment of FIG. 3 is particularly useful when the pumped oxygen stream 386 is of high enough flow or pressure and the BAC circuit is needed to generate an elevated pressure air stream, sufficient in flow and pressure to vaporize the pumped oxygen stream 386 in the main heat exchanger 52. This arrangement is also useful to enhance the safety aspects of the air separation unit as the boosted air stream 360 that is adjacent to the boiling oxygen stream in the main heat exchanger 52 is of higher pressure. The configuration of drain stream 130 and gel trap 370 of FIG. 3 is similar to that described above with reference to FIG. 1.

Figure 4:
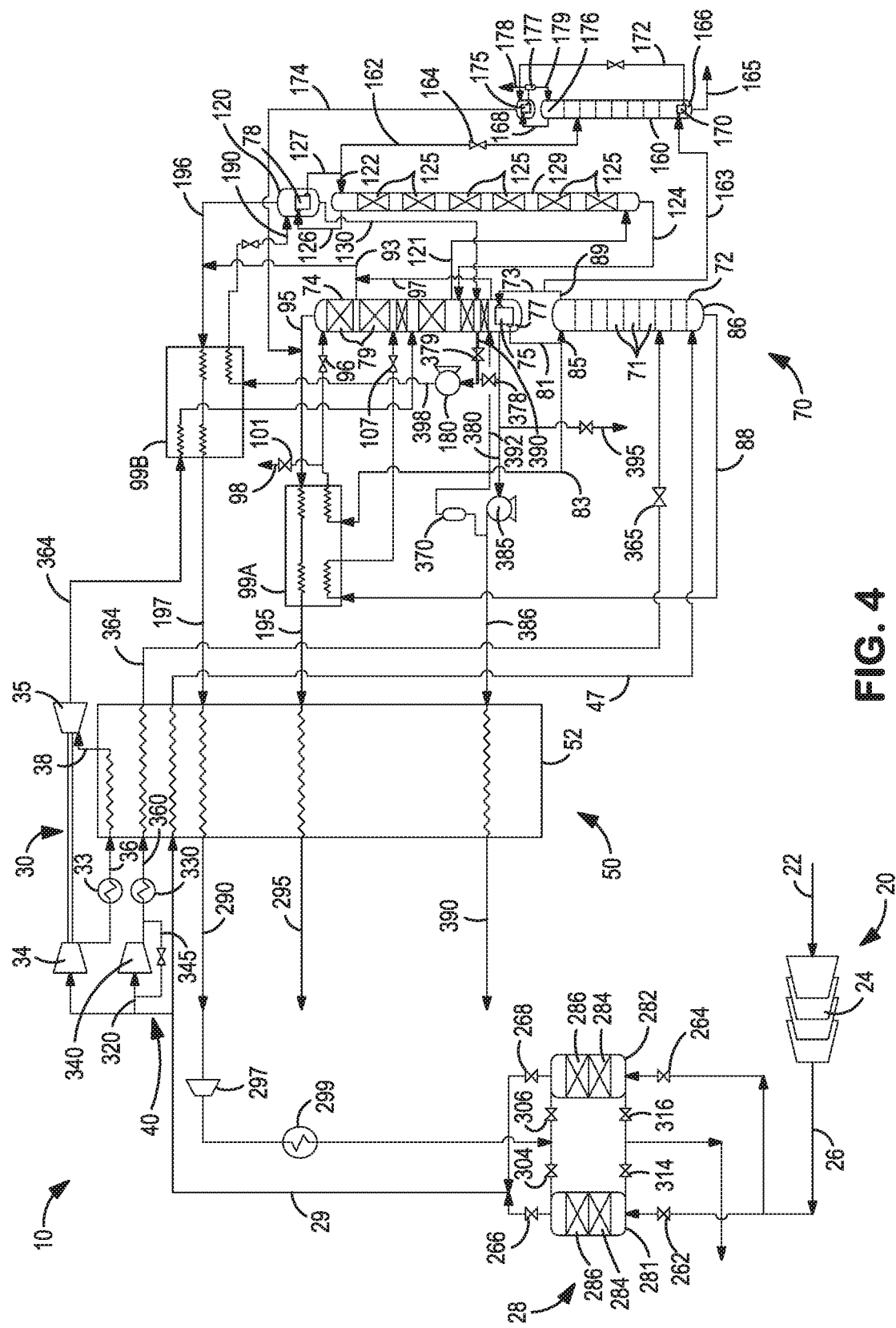
FIG. 4 is a schematic process flow diagram of an air separation unit in accordance with still another embodiment of the present invention.

Still another alternative embodiment is shown in FIG. 4. Again, since many of the components in the air separation plant shown in FIG. 4 are similar to those described above with reference to FIG. 3, the descriptions of such common components will not be repeated. The differences between the embodiment shown in FIG. 4 compared to the embodiment of FIG. 3 is a set of flow control valves 378, 379 that control the flow of the oxygen enriched liquid stream to the argon condenser 78.

The embodiment of FIG. 4 is particularly useful for air separation units that require elevated pressures of gaseous oxygen products at both high flow rate and low flow rate. In the embodiment shown in FIG. 4, two valves are shown to select the source of the oxygen from the lower pressure column 74 that supplies the argon condenser 78. First valve 378 controls the flow of the first oxygen enriched liquid stream 380 taken directly from the oxygen-rich liquid column bottoms 77 and has oxygen concentration of greater than 99.5%. Second valve 379 controls the flow of the second oxygen enriched liquid stream 390 having an oxygen concentration between about 93% and 99.7% that is taken from the lower pressure column 74 at a location a few stages above the lower pressure column sump or the extraction point of the first oxygen enriched liquid stream 380. The valves 378, 379 preferably work cooperatively in an on/off mode, such that while one valve is open, the other valve is closed.

If a relatively low gaseous oxygen flow is needed, and higher argon recovery is desired, the valve 378 is open, and the valve 379 closed such that first oxygen enriched liquid stream 380 or higher purity oxygen stream is fed to the argon condenser 78. Conversely, if a higher gaseous oxygen flow is needed, or additional power savings is desired when high argon recovery is not needed, valve 378 is closed and valve 379 open such that the second oxygen enriched liquid stream 390 or lower purity oxygen stream is fed to the boiling side of the argon condenser 78. It should be pointed out that the valve 378 is preferably a block and bleed arrangement to prevent contamination of the oxygen across the valve 378 in case of leakage.

The resulting oxygen enriched stream 398 is pumped in pump 180 and then subcooled in subcooling unit 99B via indirect heat exchange with the oxygen enriched waste stream 195 and then passed to the argon condenser 78 where it is used to condense the argon-rich stream 126 taken from the overhead 123 of the argon column 129. As discussed above with reference to other embodiments, a stream of liquid nitrogen taken from an external source (not shown) may be combined with the oxygen enriched liquid stream 398 in an effort to enhance the argon recovery. The combined stream would be used to condense the argon-rich stream 126 in argon condenser 78. The configuration of drain streams 130 and 392 and gel trap 370 of FIG. 4 is similar to that described above with reference to FIG. 2.

It should also be pointed out that, in order to be able to achieve the desired power reduction when the lower purity oxygen is fed to the boiling side of the argon condenser 78, the air separation unit 10 must be designed to operate effectively at the lower pressures associated with this mode. This means, for example, that the distillation columns 72, 74 must be designed for a larger diameter in order to operate at full capacity when the pressure is lower. Likewise, for the air separation unit to operate effectively when the higher purity oxygen is fed to the boiling side of the argon condenser 78, the air separation unit 10 must be designed to make the product slate at higher column pressures. This means that the distillation columns 72, 74 must have sufficient separation stages for this mode, as the relative volatilities between the components are closer to one another at higher pressures. The main air compressors 24, product compressors (not shown), and boiler air compressor 340 must also be designed to accommodate operation in either mode. For example, the boiler air compressor 340 may have to operate with some recirculation circuit 345 when the gaseous oxygen product rate is relatively low, unless it is designed with a variable speed drive or direct drive motor.

Argon Recovery and Refinement

The argon column arrangement employed in the above-described embodiments may preferably be configured as: (i) a first argon column (e.g. argon superstaged column or crude argon column) operatively coupled with a second argon column such as a high ratio argon column; or (ii) an argon rejection column or crude argon column integrated with the lower pressure column structure and preferably coupled to with a downstream argon refining system.

The embodiment using an argon superstaged column 129 preferably with a high ratio argon column 160 is shown in the Figs. The superstaged argon column 129 receives an argon and oxygen containing vapor feed 121 from the lower pressure column 74 and down-flowing argon rich reflux 122 received from an argon condenser 78 situated above the superstaged argon column 129. The superstaged argon column 129 has between about 180 and 260 stages of separation and serves to rectify the argon and oxygen containing vapor by separating argon from the oxygen into an argon enriched overhead vapor 126 and an oxygen-rich liquid bottoms that is returned to the lower pressure column as stream 124. The preferred mass transfer contacting elements 125 within the superstaged argon column 129 are preferably structured packing. All or a portion of resulting argon-rich vapor overhead 126 is preferably directed to the argon condenser 78 where it is condensed against the subcooled oxygen enriched stream from the lower pressure column 74. The resulting condensate is a crude liquid argon stream is taken from the argon condenser 78 most of which is returned to the superstaged argon column 129 as argon reflux stream 127.

The high ratio argon column 160 also receives a portion of the crude liquid argon stream exiting the argon condenser 78 as stream 162 which is modulated in pressure in valve 164 and introduced at an intermediate location of the high ratio argon column 160. The crude argon is rectified within the high ratio column 160 to form liquid argon bottoms 166 and a nitrogen-containing high ratio column overhead 168. A high purity liquid argon product stream 165 is taken from the liquid argon bottoms 166 of the high ratio argon column 160.

A portion of the nitrogen-rich column overhead extracted from proximate the top of higher pressure column 72 is also diverted as stream 163 to the high ratio column reboiler 170 disposed at the bottom of the high ratio argon column 160 where the stream is condensed to form liquid nitrogen stream 172. The liquid nitrogen stream 172 is then directed or transferred to the high ratio column condenser 175 where it provides the refrigeration duty to condense or partially condense the nitrogen-rich high ratio column overhead 168. The vaporized nitrogen stream 174 exiting the high ratio column reboiler 175 is directed to and mixed with the nitrogen product stream 95 upstream of subcooling unit 99A.

The nitrogen-rich high ratio column overhead 168 is taken from a location near the top of the high ratio column 160 and subsequently condensed or partially condensed in the high ratio column condenser 175. The resulting stream 176 is sent to a phase separator 177 configured to vent the vaporized portion 178 while returning the liquid portion 179 as reflux to the high ratio argon column 160. Using this arrangement, the argon recovery from the air separation plant as high as 96% can be attained.

Other embodiments using alternative argon production and refining options are contemplated for use with the present system and method. Crude argon-rich streams withdrawn from the argon column arrangement can be recovered or purified in an argon refining system, such as a liquid adsorption based argon purification/refining system, a gaseous phase adsorption based argon purification/refining system, or a catalytic deoxo based argon purification/refining system. In another alternative, the high ratio argon column is eliminated and product purity argon is produced directly from superstaged column 129 (not shown). In this case, another distillation section is included at the top of the superstaged column. In this section, called a pasteurization zone, small amounts of nitrogen can be removed to insure reliable product argon purity. The small nitrogen richer stream is vented from the top of column 129 and product argon is withdrawn below the pasteurization zone. A taller distillation section just above vapor draw stream 121 in lower pressure column is needed so that less nitrogen enters superstaged column 129. This alternative is described in U.S. Pat. No. 5,133,790.

Figure 5:
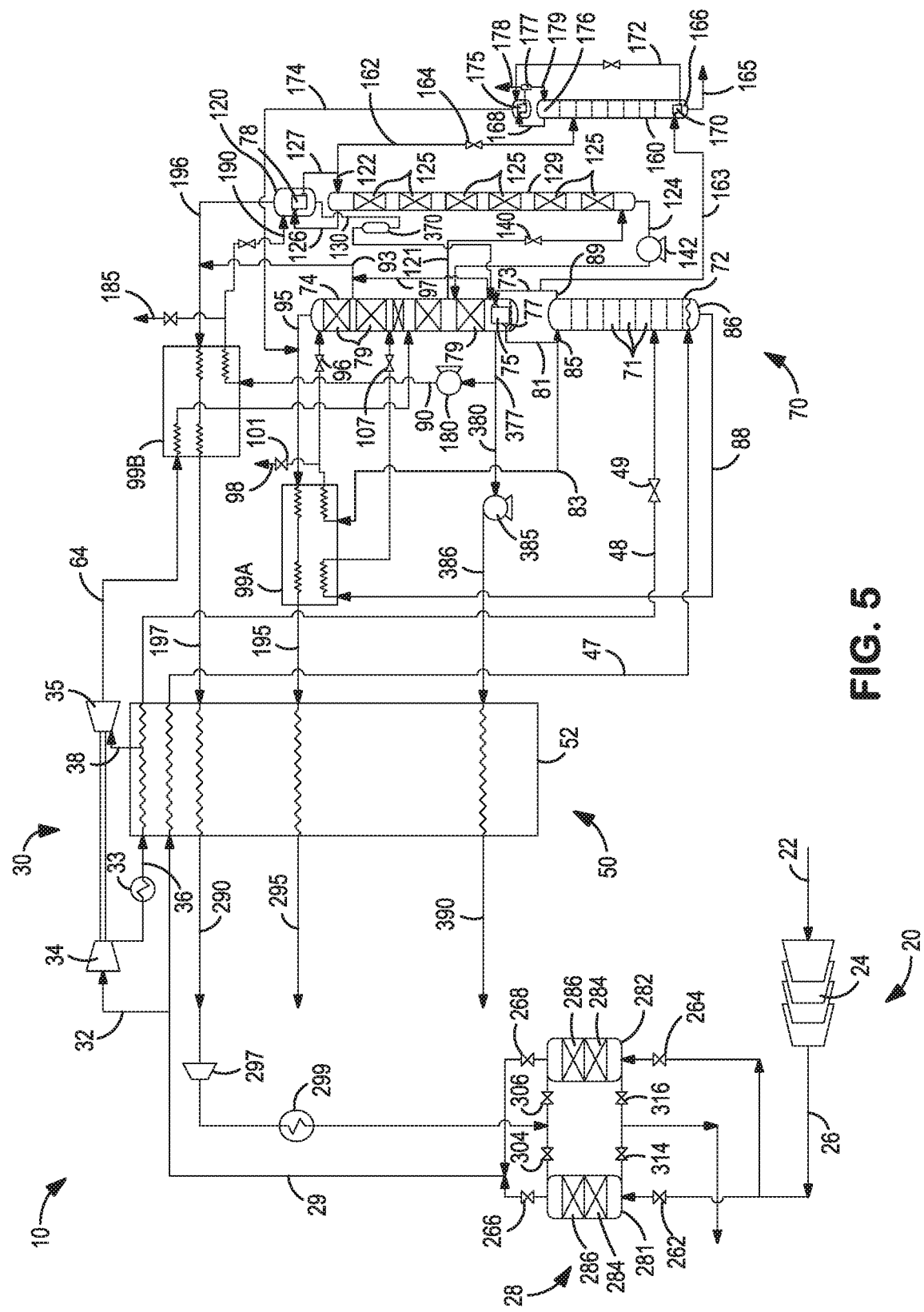
FIG. 5 is a schematic process flow diagram of an air separation unit in accordance with yet another embodiment having increased pressures within distillation column system.
Figure 6:
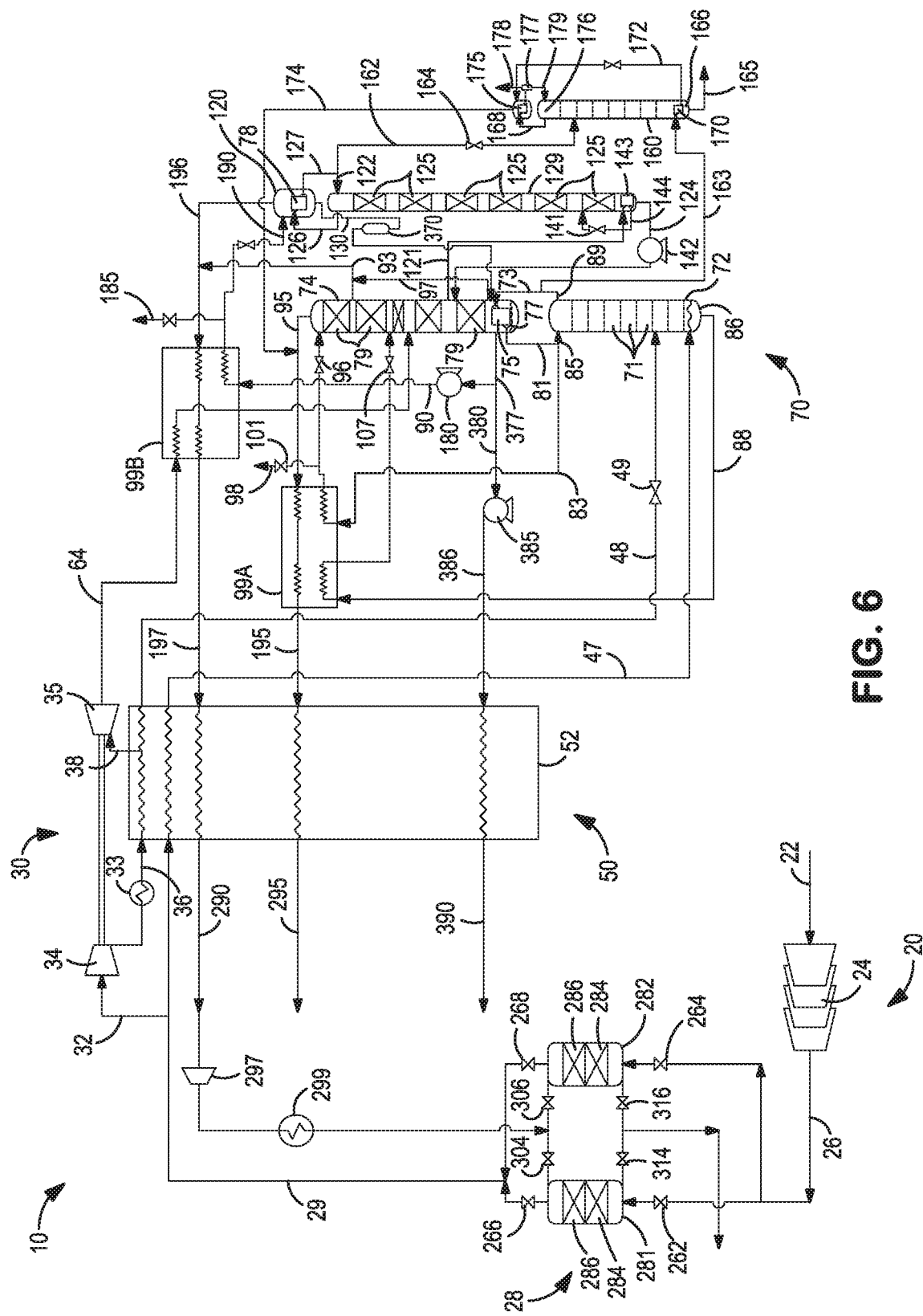
FIG. 6 is a schematic process flow diagram of an air separation unit in accordance with still another embodiment having increased pressures within the distillation column system.

Recovery of Nitrogen and Argon with Increased Pressures in Distillation Column System Additional embodiments of the present air separation system and method are shown in FIG. 5 and FIG. 6. These embodiments allow operation of the higher pressure column and lower pressure column of the distillation column system at somewhat increased pressures compared to the embodiments described above with reference to FIGS. 1-4, and generally above that naturally set by the argon column condenser. Operation of the argon column at minimum pressure, however, is maintained so as to avoid a large argon recovery penalty. Argon column minimum pressure is often set by the condensation in the argon condenser against low pressure oxygen boiling stream. Increased pressures in the higher pressure column and lower pressure column of the distillation column system will produce a higher pressure gas nitrogen product, although with corresponding decrease in nitrogen recovery and increase in power consumption. Some advantages associated with increased pressures of the higher pressure column and lower pressure column may be realized in reduction in cost or possible elimination of the product nitrogen compressor as well as possible reduction in column diameters and associated capital costs of the lower pressure column and higher pressure column.

The key differences between the embodiment of FIG. 5 and those embodiments depicted in FIGS. 1-4 include valve 140 and pump 142. By letting down the pressure of the argon and oxygen containing vapor stream 121 feeding the argon column, through valve 140, the argon column can operate at or near its minimum pressure. Because of the lower pressure of operation of argon column 129 relative to lower pressure column 74, pump 142 is required to return the bottoms liquid 124 from the argon column back to the lower pressure column 74. In the embodiment of FIG. 5, the pressure range of the lower pressure column is preferably between about 1.7 bar(a) to 3.5 bar(a) while the pressure range of the higher pressure column is preferably between about 7 bar(a) to 12.5 bar(a) and the pressure of the argon column remains between about 1.5 bar(a) to about 2.8 bar(a).

In the embodiment of FIG. 6, the argon and oxygen containing vapor stream 121 feeding the argon column first passes into reboiler 143 disposed within the base of the argon column 129. The fully condensed or partially condensed stream 144 is let down in pressure through valve 141 and then fed several separation stages above the bottom of the argon column, preferably between about 3 stages and 10 stages above the bottom of the argon column. As a result of the use of reboiler 143, the pressure of lower pressure column 74 must be elevated relative to the pressure of the argon column 129. Specifically, in the embodiment shown, the pressure of the lower pressure column is preferably at least 0.35 bar(a) above the pressure in the argon column. While the embodiment of FIG. 6 includes the additional capital cost associated with the reboiler 143 and pump 142, the benefit is that this embodiment should provide an additional 1% to 5% of argon recovery compared to the embodiment shown in FIG. 5 and should also allow a reduction in the number of separation stages within the argon column.

Use of Oxygen Enriched Waste Stream as Regenerating Gas for Adsorption Based Prepurifier When using an adsorption based prepurification unit, it is desirable to have a continuous flow of compressed, dry, prepurified and cooled streams of air enter the distillation column system of the air separation unit. The prepurification process is preferably done by using multiple adsorbent beds, preferably arranged as a two-bed temperature swing adsorption unit. In the preferred two bed temperature swing adsorption prepurifier, one bed is in an on-line operating phase adsorbing the impurities in the incoming feed air while the other bed is in an off-line operating phase where the bed is being regenerated with all or a portion of the high purity waste oxygen stream. In many two bed adsorption cycles, there may be a short overlap period when both beds are in an on-line operating phase as the one bed switches from the on-line operating phase to the off-line operating phase and the other bed switches from the off-line operating phase to the on-line operating phase.

As is well known in the art, the adsorption bed operating in the on-line phase can only remain on-line until it reaches its capacity to adsorb the impurities and impurity breakthrough will likely occur. The impurity breakthrough point is generally defined by the time required for the contaminants, for instance, water vapor and carbon dioxide, to reach unacceptable levels at the outlet, suggesting the adsorption bed is saturated with contaminants. Once the breakthrough point is approached, the on-line adsorbent bed is brought off-line and the previously regenerated bed is brought back on-line to adsorb the impurities in the feed air.

The preferred temperature swing adsorption unit is a compound adsorbent arrangement that includes at least one layer of alumina 284 below and at least one layer of molecular sieve 286. Alumina is used to remove most of the water vapor while the molecular sieve is used to remove water vapor, carbon dioxide, nitrous oxide, and hydrocarbon contaminants from the incoming feed air. A compound bed is typically designed with enough alumina at the bottom of the bed to remove most of the water from the compressed air feed stream, with the remainder removed by a sieve layer above it. Compound beds typically have lower purge or regeneration gas flow requirements and require approximately 30% less regeneration energy than all-sieve beds as they can be regenerated at lower temperatures.

Temperature swing adsorption prepurifiers preferably operate with cycle times for the "on-line" adsorption in the range of between about 6 and 12 hours. Because of these long cycle times, the temperature swing adsorption prepurifiers can depressurize and re-pressurize over a longer timespan compared to pressure swing adsorption units resulting in more stable column operation for the air separation unit. Shorter cycle times help keep initial capital costs low because less adsorbent and shorter adsorbent heights are required in vertical and horizontal oriented beds. However, longer cycle times yield reduced operating costs from reduced parasitic losses of blowdown and regeneration energy. Incoming compressed air or feed air temperatures to temperature swing adsorption prepurifiers can range from 37° F. to as high as 75° F. and typically the incoming compressed air stream air is preferably cooled to between about 40° F. to 60° F. Two common forms of feed air coolers used to cool the compressed air stream include a dual stage aftercooler and a direct contact aftercooler (not shown).

A temperature swing adsorption prepurifier also requires a purge or regeneration gas flow that is between about 5% and 30% of the feed air or incoming compressed air stream flow, and more preferably a flow equal to about 10% of the incoming compressed air stream. Purge or regeneration gas flow passes through the bed counter-current to the feed air flow. The purge or regeneration gas flow carries regeneration heat into the bed where it causes the contaminants to desorb from the adsorbent, removes the desorbed contaminants from the bed and cools the bed at the end of the regeneration cycle. At the beginning of the regeneration cycle, the purge gas is heated for the hot purge. Later in the cycle, the purge gas is not heated, and this is the cold purge.

The regeneration heater must be sized so that it can heat the purge or regeneration gas flow from its initial temperature to the desired regeneration temperature. Important considerations in regeneration heater sizing are the initial temperature of the purge or regeneration gas, the required purge or regeneration gas flowrate, the heat loss between the heater and the adsorbent beds and the heater efficiency. When the regeneration or purge gas is an oxygen enriched stream, the heater outlet temperature should be less than about 400° F. for safety reasons. With the selection of special materials the heater outlet temperature can be as high as 450° F. safely. In addition, only steam, electric or other non-fired heaters should be used in when the regeneration or purge gas is an oxygen enriched stream.

Regeneration blower 297 is preferably used to raise the pressure of waste stream 290 sufficiently to pass through the adsorption based prepurification unit for regeneration purposes. Exiting the regeneration blower 297, the pressure of waste stream 290 is raised so that it will pass through the regeneration heater, prepurifier vessels and their associated adsorbent beds, and the associated valves to then vent to the atmosphere. The regeneration blower 297 is preferably configured to raise the pressure of the waste stream 290 exiting the main heat exchanger by about 0.1 bar(a) to 0.3 bar(a).

While us of the regeneration blower is optional, operating the air separation unit without the regeneration blower requires the distillation column system to be run at a sufficiently high pressure such that that the waste stream exiting main heat exchanger can pass through the prepurification unit. Put another way, the use of the regeneration blower allows the reduction in operating pressure of the argon column and the lower pressure column by about 0.15 bar(a) to 0.5 bar(a) and reduction in pressure of higher pressure column by about 0.35 bar(a) to 2.0 bar(a).

The primary benefit of a regeneration blower in the disclosed air separation is cycle is primarily related to argon production. Without a regeneration blower, high argon recovery is feasible, but nonetheless the higher pressure in argon column results in the need for many separation stages in the argon column and potentially additional stages in the lower pressure column. The design and operational sensitivity of argon recovery is also large. With the use of a regeneration blower, and the concomitant reduction in distillation column pressures, tends to make argon recovery more facile. Argon recovery will improve, especially in scenarios or embodiments where the targeted argon recovery is lower and also reduces the staging requirement of argon column and lower pressure column.

The purge-to-feed (P/F) ratio is the ratio of the purge or regeneration gas flow to the feed air flow. The required P/F ratio is dependent upon several variables, including type of adsorbent, regeneration temperature, cycle time, and hot purge ratio but is preferably in the range of between about 0.05 and 0.40. Higher regeneration temperature reduces the necessary P/F ratio. Longer cycle times require slightly lower P/F ratios. The hot purge ratio is the ratio of the hot purge time to the total purge time (i.e. hot purge time plus cold purge time). A hot purge ratio of about 0.40 is typically used for temperature swing adsorption prepurifiers to ensure that enough cold purge time is available to effectively cool the adsorption bed, but some air separation units may operate at higher hot purge ratios. Smaller hot purge ratios result in higher P/F ratios because the same amount of heat has to be carried into the adsorption bed in a shorter amount of time.

Referring back to FIG. 1, a schematic illustration of an air separation unit 10 with a temperature swing adsorption prepurifier 28 is shown. In the temperature swing adsorption process there are generally multiple different steps that each of the adsorbent beds undergoes, namely: blend; adsorption; blend, depressurization; hot purge; cold purge; and repressurization. Table 1 below shows the correlation of the performance of the steps within the two adsorbent beds.

TABLE 1

Example of Two-Bed Temperature Swing Adsorption Cycles and Times

| Step # | Adsorbent Bed #1 State | Duration (min) | Adsorbent Bed #2 State | Duration (min) |
|---|---|---|---|---|
| 1 | Blend | 20 | Blend | 20 |
| 2 | Depressurization | 10 | Adsorption | 450 |
| 3 | Hot Purge | 170 | | |
| 4 | Cold Purge | 250 | | |
| 5 | Repressurization | 20 | | |
| 6 | Blend | 20 | Blend | 20 |
| 7 | Adsorption | 450 | Depressurization | 10 |
| 8 | | | Hot Purge | 170 |
| 9 | | | Cold Purge | 250 |
| 10 | | | Repressurization | 20 |

In the above example, during the "blend" steps, both adsorbent beds are "on-line" and valves 262, 264, 266, and 268 are opened while valves 304, 306, 314 and 316 are closed. The feed air stream is split evenly between the two beds during this step with no purge or regeneration gas in the system. While "on-line", adsorbent beds 281 and 282 are adsorbing water vapor and other contaminants such as carbon dioxide. The purpose of this blend step is to dilute the amount of residual heat left in the adsorbent bed during regeneration and thus prevent a heated stream from being fed back to the cold box housing the distillation columns.

Following the "blend" step, one adsorbent bed 281 is subjected to the regeneration process and is going "off-line" while the other adsorbent bed 282 receives the full feed flow and goes through the adsorption step where water vapor, carbon dioxide, and hydrocarbons continue to be adsorbed. Such regeneration process is completed by way of four distinct steps including: depressurization; hot purge; cold purge; and repressurization. It will be appreciated by those skilled in the art that other steps may also be included. During the depressurization step, adsorption bed 281 depressurizes from the feed pressure to a lower pressure, typically to near atmospheric pressure. This is accomplished by closing valves 262 and 266 and opening valve 314. The lower pressure is the regeneration pressure and this step lasts for about 10 minutes but the length of time can vary depending on equipment constraints or process limitations. Once depressurized, the hot purge step starts with the regeneration oxygen enriched waste stream 290 is heated using the heater 299 to increase the temperature of the oxygen enriched waste stream to a temperature higher than the temperature of the feed air and usually above 300° F. and below 380° F., depending on the process and adsorbent material constraints. Operation as high as 400° F. is allowable. With special material selection the operation can be as high as 450° F. During this time, valve 304 opens and allows the oxygen enriched waste stream to pass through adsorbent bed 281. After a certain time period elapses, in this example after 170 minutes, the oxygen enriched waste stream bypasses heater 299 or the heater, if an electric heated, is shut-off, lowering the waste stream gas temperature to close to ambient conditions typically but not always between about 40° F. and 100° F. Turning off the electric heater or bypassing the heater starts the cold purge step, which continues to purge the adsorption bed with the oxygen enriched waste stream, but without the heat, which lowers the temperature of the adsorbent bed as well as advancing the heat front through the adsorption bed. In this example this cold purge step lasts about 250 minutes.

The repressurization step for adsorption bed 281 is initiated by closing valves 314 and 304 and opening valve 262. This allows part of the compressed air stream 26 to pressurize the vessel from near ambient pressures to the elevated feed pressure. Once pressurized to the feed pressure, both adsorbent beds 281 and 282 enter the blend step and as such, valves 266 opens allowing the feed stream to be split evenly between adsorbent beds 281 and 282. After a certain amount of time in the blend step, the beds adsorbent switch and now adsorbent bed 281 is on-line in the adsorption step and adsorbent bed 282 goes through the regeneration steps.

As mentioned above, an air separation process that is conducted in accordance with the present invention is preferably conducted using the higher purity oxygen waste stream as the regeneration gas for the temperature swing adsorption prepurification unit. Such regeneration of adsorbent beds using an oxygen stream having a purity greater than 90% has not been used in the prior art air separation plants. The present invention, however, allows use of high purity oxygen as the regeneration gas only where the temperature of the regeneration gas is limited to 450° F. or more preferably 400° F. which thus allows an overall higher nitrogen recovery from the air separation plant. The higher nitrogen recovery improves the cost efficiency of the nitrogen producing air separation plant both in terms of lower capital costs and lower operating costs. For example, the present nitrogen producing air separation plant sized to produce 3000 mcfh of high purity nitrogen at moderate pressure and having a 98.0% recovery of nitrogen would require 3925 mcfh of feed air that must be compressed, pre-purified, cooled and rectified. On the other hand, the prior art nitrogen producing air separation plant as described in U.S. Pat. No. 4,822,395 sized to produce 3000 mcfh of high purity nitrogen at moderate pressure and having a 94.6% recovery of nitrogen would require 4066 mcfh of feed air that must be compressed, pre-purified, cooled, and rectified. The increased costs of operating the prior art nitrogen producing air separation plant may include additional power to compress the increased volumetric flow rates of incoming feed air, additional adsorbent materials required to pre-purify the higher flows of incoming feed air, and possibly increased capital equipment costs of the turbomachinery, heat exchangers, aftercoolers, pre-purifiers, column internals, etc. that may be required to handle the increased volume of incoming feed air.

It is to be noted here that although water vapor and carbon dioxide removal is discussed herein, it is understood that other impurities will also be removed by the adsorbent or adsorbents, for instance nitrous oxide, acetylene and other trace hydrocarbons. However, water vapor and carbon dioxide are present in much higher concentration than such other impurities and will therefore have the greatest impact on the amount of adsorbent required. Also, while the above discussion is tailored to temperature swing adsorption prepurifiers, the teachings and scope of the invention may also be applicable to some hybrid prepurifier arrangements.

Examples

Tables 2 and 3 below show the results of the computer based process simulations for the present systems and methods shown and described above with reference to FIGS. 1 and 2, respectively. For comparative purposes, references to the corresponding stream and data from the prior art Cheung system are also included while Table 4 provides the comparable data from the Cheung prior art system and method. Table 5 compares the argon recovery and nitrogen recovery of the selected embodiments of the present system and compares the recoveries to the argon and nitrogen recovery in the Cheung prior art system. In the simulation run for the embodiment of FIG. 1, the purity of the oxygen enriched liquid stream is 99.6% and the flow of the pumped liquid oxygen product is 2.1% of the total incoming air feed (or 10% of the available oxygen), while in the simulation run for the embodiment of FIG. 2, the purity of the second oxygen enriched liquid stream is 93.7% and the flow of the pumped liquid oxygen product is also 15.5% of the total incoming air feed.

TABLE 5

| Air Separation System | Argon Recovery | Nitrogen Recovery |
|---|---|---|
| Cheung (Prior Art) | 92.7% | 94.6%/91.6% |
| Present System (FIG. 1) | ≥88.6%* | 99.99% |
| Present System (FIG. 2) | ≥30.6%** | 99.99% |

*Depending on volume of high purity pumped liquid oxygen product taken (i.e. stream 386)
**Depending on volume of high purity pumped liquid oxygen product taken (i.e. stream 386) and oxygen purity of second oxygen enriched liquid stream (i.e. stream 398)

TABLE 2

| Stream Ref | Reference in Cheung | Flow | Pressure | Temp | % Oxygen | % Nitrogen | % Argon |
|---|---|---|---|---|---|---|---|
| 22 (FIG. 1) | N/A | 100% | 14.7 | 294.3 | 21.0 | 78.1 | 0.9 |
| 29 (FIG. 1) | N/A | 100% | 120.5 | 286.0 | 21.0 | 78.1 | 0.9 |
| 47 (FIG. 1) | Stream 10 | 89.6% | 118.3 | 108.5 | 21.0 | 78.1 | 0.9 |
| 36 (FIG. 1) | N/A | 10.4% | 198.1 | 310.5 | 21.0 | 78.1 | 0.9 |
| 64 (FIG. 1) | Stream 23 | 8.3% | 32.9 | 110.3 | 21.0 | 78.1 | 0.9 |
| 90 (FIG. 1) | 40 | 28.4% | 131.0 | 98.8 | 99.6 | 0.0 | 0.4 |
| 190 (FIG. 1) | N/A | 28.4% | 19.9 | 93.2 | 99.6 | 0.0 | 0.4 |
| 380 (FIG. 1) | Stream 26 | 2.1% | 33.1 | 98.7 | 99.6 | 0.0 | 0.4 |
| 390 (FIG. 1) | N/A | 2.1% | 175.0 | 287.0 | 99.6 | 0.0 | 0.4 |
| 196 (FIG. 1) | Stream 41 | 18.9% | 19.9 | 93.16 | 99.5 | 0.0 | 0.5 |
| 290 (FIG. 1) | N/A | 18.9% | 17.7 | 287.0 | 99.5 | 0.0 | 0.5 |
| 95 (FIG. 1) | Stream 25 | 77.1% | 31.7 | 84.5 | <100 ppb | >99.98 | <0.02 |
| 195 (FIG. 1) | N/A | 78.1% | 31.1 | 103.5 | <100 ppb | >99.98 | <0.02 |
| 295 (FIG. 1) | N/A | 78.1% | 29.4 | 287.0 | <100 ppb | >99.98 | <0.02 |
| 165 (FIG. 1) | Stream 32 | 0.8% | 34.8 | 96.3 | <1 ppm | <1 ppm | >99.999 |
| 178 (FIG. 1) | N/A | 0.006% | 31.8 | 88.6 | ~100 ppb | 70.3 | 29.7 |
| 174 (FIG. 1) | N/A | 1.0% | 31.7 | 85.7 | <100 ppb | >99.98 | <0.02 |

TABLE 3

| Stream Ref | Reference in Cheung | Flow | Pressure | Temp | % Oxygen | % Nitrogen | % Argon |
|---|---|---|---|---|---|---|---|
| 22 (FIG. 2) | N/A | 100% | 14.7 | 294.3 | 21.0 | 78.1 | 0.9 |
| 29 (FIG. 2) | N/A | 100% | 115.5 | 286.0 | 21.0 | 78.1 | 0.9 |
| 47 (FIG. 2) | Stream 10 | 85.0% | 113.3 | 107.3 | 21.0 | 78.1 | 0.9 |
| 36 (FIG. 2) | N/A | 15.0% | 188.1 | 310.5 | 21.0 | 78.1 | 0.9 |
| 64 (FIG. 2) | Stream 23 | 6.5% | 31.1 | 110.2 | 21.0 | 78.1 | 0.9 |
| 398 (FIG. 2) | 40 | 9.2% | 131.0 | 98.8 | 93.7 | 0.0 | 6.3 |
| 190 (FIG. 2) | N/A | 9.2% | 19.9 | 92.9 | 93.7 | 0.0 | 6.3 |
| 380 (FIG. 2) | Stream 26 | 15.5% | 31.4 | 98.1 | 99.5 | 0.0 | 0.5 |
| 390 (FIG. 2) | N/A | 7.3% | 175.0 | 287.0 | 99.5 | 0.0 | 0.5 |
| 196 (FIG. 2) | Stream 41 | 6.1% | 19.9 | 92.9 | 93.0 | 0.0 | 7.0 |
| 290 (FIG. 2) | N/A | 14.1% | 17.7 | 287.0 | 96.6 | 0.0 | 3.4 |
| 95 (FIG. 2) | Stream 25 | 77.9% | 29.8 | 83.9 | <100 ppb | >99.9 | <0.1 |
| 195 (FIG. 2) | N/A | 78.1% | 29.4 | 96.2 | <100 ppb | >99.9 | <0.1 |
| 295 (FIG. 2) | N/A | 78.1% | 29.4 | 287.0 | <100 ppb | >99.9 | <0.1 |
| 165 (FIG. 2) | Stream 32 | 0.3% | 33.2 | 95.7 | <1 ppm | <1 ppm | >99.999 |
| 178 (FIG. 2) | N/A | 0.002% | 30.2 | 88.0 | ~100 ppb | 70.7 | 29.3 |
| 174 (FIG. 2) | N/A | 0.3% | 29.8 | 85.8 | <100 ppb | >99.9 | <0.01 |

TABLE 4

| Stream Ref | Reference in Present Figs. | Flow | Pressure | Temp | % Oxygen | % Nitrogen | % Argon |
|---|---|---|---|---|---|---|---|
| 10 (Cheung) | 41 (FIGS. 1 & 2) | (92.7%) | 117.9 | 109.3 | 21.0 | 78.1 | 0.9 |
| 23 (Cheung) | 64 (FIGS. 1 & 2) | (7.3%) | 30.4 | 95.3 | 21.0 | 78.1 | 0.9 |
| 25 (Cheung) | 95 (FIGS. 1 & 2) | 73.9% | 27.7 | 83.2 | 1 ppm | >99.98 | — |
| 40 (Cheung) | 398 (FIGS. 1 & 2) | — | — | — | ≥99.75 | 0 | — |
| 26 (Cheung) | 380 (FIGS. 1 & 2) | — | — | — | — | 0 | ≥0.25 |
| 41 (Cheung) | 196 (FIGS. 1 & 2) | — | — | — | ≥99.75 | 0 | — |
| 42 (Cheung) | 196 + 380 (FIGS. 1/2) | 21.0% | 18.2 | 92.6 | 99.75 | 0 | 0.25 |
| 32 (Cheung) | 165 (FIGS. 1/2) | 0.9% | 27.3 | 93.6 | 1.9 | 0.8 | 97.3 |

Gas recoveries disclosed in U.S. Pat. No. 4,822,395 (Cheung) and shown in Table 5 above, represent cold box recoveries and do not account for potential losses in the main heat exchanger or in regeneration of the prepurifier beds. Table 5 provides both the disclosed argon recovery in Cheung from the cold box (92.7%) and the estimated argon recovery from the entire air separation unit (92.7%) Likewise, Table 5 also provides both the disclosed nitrogen recovery in Cheung from the cold box (94.6%) and the estimated nitrogen recovery from the entire air separation unit (91.6%). Such estimates are based on a technical paper authored by Cheung as well as actual embodiments of the Cheung plant installed in the field. The estimated nitrogen recovery in Cheung represents the remaining nitrogen available as a nitrogen product after blending some of the nitrogen with the waste stream to bring the oxygen purity in the waste stream down to 80% (i.e. prior art levels of oxygen in regeneration of adsorption based prepurifier units for air separation plants).

Although the present system for recovery of argon and nitrogen from an air separation unit has been discussed with reference to one or more preferred embodiments and methods associated therewith, as would occur to those skilled in the art that numerous changes and omissions can be made without departing from the spirit and scope of the present inventions as set forth in the appended claims.

What is claimed is:

1. A method of separating air to produce one or more nitrogen products and one or more high purity oxygen products in a cryogenic air separation unit, the method comprising the steps of:
    compressing a stream of incoming feed air to produce a compressed air stream;
    purifying the compressed air stream in an adsorption based prepurification unit configured to removing water vapor, carbon dioxide, nitrous oxide, and hydrocarbons from the compressed air stream to producing a compressed and purified air stream;
    splitting the compressed and purified air stream is split into at least a first part of the compressed and purified air stream and a second part of the compressed and purified air stream;
    cooling the first part of the compressed and purified air stream to a vapor air stream at a temperature suitable for rectification in a cryogenic distillation system and partially cooling the second part of the compressed and purified air stream;
    expanding the partially cooled second part of the compressed and purified air stream in a turbine to form an exhaust stream;
    rectifying the liquid air stream and exhaust stream in a cryogenic distillation column system having a higher pressure column having an operating pressure between 6.0 bar(a) and 10.0 bar(a) and a lower pressure column having an operating pressure between 1.5 bar(a) and 2.8 bar(a), the higher pressure column and the lower pressure column being linked in a heat transfer relationship via a condenser reboiler, wherein the rectifying step produces a first oxygen enriched stream from the lower pressure column having a first oxygen concentration greater than or equal to 99.5 percent oxygen, a second oxygen enriched stream from the lower pressure column having a second oxygen concentration greater than 93 percent and lower than the first oxygen concentration, a nitrogen overhead stream from the lower pressure column; and a condensed nitrogen stream from the condenser-reboiler;
    rectifying an oxygen-argon stream extracted from the lower pressure column in an argon column arrangement, the argon column arrangement having at least one argon column and an argon condenser and wherein the argon column is configured to produce a third oxygen enriched stream and an argon-enriched overhead;
    subcooling an oxygen enriched kettle stream from the higher pressure column and the condensed nitrogen stream from the condenser-reboiler via indirect heat exchange with the nitrogen overhead stream from the lower pressure column;
    returning the third oxygen enriched stream from the argon column to the lower pressure column;
    directing the argon-enriched overhead from the argon column and the second oxygen enriched stream to an argon condenser;
    condensing the argon-enriched overhead in the argon condenser against the second oxygen enriched stream from the lower pressure column to produce a crude argon stream or a product argon stream, an argon reflux stream and an oxygen enriched waste stream;
    wherein the method recovers greater than 30 percent of the argon in the feed air stream; and
    wherein the method produces one or more nitrogen products and recovers greater than 98 percent of the nitrogen contained in the feed air stream; and
    wherein the method produces one or more high purity oxygen products including a high purity pumped oxygen stream from the first oxygen enriched stream at a pressure greater than or equal to 3.4 bar(a).

2. The method of claim 1 wherein the adsorption based pre-purifier unit is a multi-bed temperature swing adsorption unit configured to purifying the compressed air stream, the multi-bed temperature swing adsorption unit is configured such that each bed alternates between an on-line operating phase adsorbing the water vapor, carbon dioxide, nitrous oxide, and hydrocarbons from the compressed air stream and an off-line operating phase where the bed is regenerated with the oxygen enriched waste stream having greater than 90.0 percent oxygen content.

3. The method of claim 1, further comprising the step of subcooling the second oxygen enriched stream via indirect heat exchange with the oxygen enriched waste stream prior to directing the second oxygen enriched stream to the argon condenser.

* * * * *